United States Patent
LePera et al.

(10) Patent No.: US 11,321,068 B2
(45) Date of Patent: May 3, 2022

(54) UTILIZING MEMORY COHERENCY TO IMPROVE BANDWIDTH PERFORMANCE

(71) Applicant: International Business Machines Corporation, Armonk, NY (US)

(72) Inventors: William P. LePera, Wappingers Falls, NY (US); Austen William Lauria, Wappingers Falls, NY (US); Scott Miller, Poughkeepsie, NY (US); Sameh Sherif Sharkawi, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/561,682

(22) Filed: Sep. 5, 2019

(65) Prior Publication Data

US 2021/0072967 A1 Mar. 11, 2021

(51) Int. Cl.
 *G06F 8/65* (2018.01)
 *G06F 9/50* (2006.01)

(52) U.S. Cl.
 CPC .............. *G06F 8/65* (2013.01); *G06F 9/5027* (2013.01)

(58) Field of Classification Search
 None
 See application file for complete search history.

(56) References Cited

U.S. PATENT DOCUMENTS

| | | |
|---|---|---|
| 8,917,279 B2 | 12/2014 | Becchi et al. |
| 9,110,795 B2 | 8/2015 | Stewart et al. |
| 10,262,390 B1* | 4/2019 | Sun .................. G06F 9/4881 |
| 10,319,060 B2 | 6/2019 | Rao et al. |
| 2014/0049548 A1* | 2/2014 | Rao ..................... G06T 1/60 345/502 |
| 2015/0268978 A1* | 9/2015 | Vu ..................... G06F 9/45525 718/1 |
| 2016/0162190 A1* | 6/2016 | Riguer ............... G06F 12/023 711/170 |
| 2017/0010978 A1* | 1/2017 | Stabrawa ............ G06F 9/5016 |
| 2019/0005606 A1 | 1/2019 | Yang |
| 2019/0042124 A1 | 2/2019 | Doshi et al. |

FOREIGN PATENT DOCUMENTS

EP 3185128 A1 6/2017

* cited by examiner

*Primary Examiner* — Lewis A Bullock, Jr.
*Assistant Examiner* — Mark A Gooray
(74) *Attorney, Agent, or Firm* — Daniel M. Yeates (57) ABSTRACT

A computer implemented method uses memory coherence to enhance latency and bandwidth performance, the method including receiving, by a host, a call from an application. The method also includes, determining that the call includes a device allocation command, wherein the device allocation command is configured to allocate a set of data on a graphical processing unit. The method further includes intercepting the call. The method includes, initiating an alternate data allocation command; and returning the alternate data allocation command to the application. Further aspects of the present disclosure are directed to systems and computer program products containing functionality consistent with the method described above.

14 Claims, 4 Drawing Sheets

UTILIZING MEMORY COHERENCY TO IMPROVE BANDWIDTH PERFORMANCE

BACKGROUND

The present disclosure relates to parallel processing and, more specifically, to enhancing bandwidth performance in host GPU communication.

High performance computing systems utilize parallel processing for running advanced application programs efficiently, reliably, and quickly. To meet the needs of scientific research, engineering simulations, and other application, supercomputers are growing at an unrelenting rate.

SUMMARY

Disclosed is a computer implemented method to use memory coherence to enhance latency and bandwidth performance, the method including receiving, by a host, a call from an application. The method also includes, determining that the call includes a device allocation command, wherein the device allocation command is configured to allocate a set of data on a graphical processing unit. The method further includes intercepting the call. The method include initiating an alternate data allocation command; and returning the alternate data allocation command to the application. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to parallel processing, and, more specifically, to enhancing bandwidth performance in host GPU communication.

High performance computing systems utilize parallel processing for running advanced application programs efficiently, reliably, and quickly. To meet the needs of scientific research, engineering simulations, and other applications, supercomputers are growing at an unrelenting rate.

Supercomputers have increased in size from thousands to hundreds-of-thousands of processor cores. They also may use many accelerators, such as graphical processing units (GPU). Optimizing data transfer between all these components becomes a challenge. There are various protocols for managing the data transfers between host and GPUs, one of which is the compute unified device architecture (CUDA, or cuda).

GPUs and hosts contain separate memory. Generally, a CPU can't read the GPU memory and GPU can't read the host memory. Host memory is the memory used by a host device. This include random access memory, one or more caches, and other similar memory. GPU memory is the physical memory location on a GPU. Programming applications to take advantage of GPUs capabilities may be difficult. For example, the application may allocate data to the host memory and have the host process the data too prepare for GPU processing. Next, the data is allocated to the GPU memory, the GPU processes the data, and the results of the processing are then allocated back to the host. Then the host can return the processed data to the application.

Cuda has several calls that, when part of an application, direct where to allocate memory. For example, cudaMallocHost allocates memory on the host device, while cudaMalloc allocates the memory on the GPU device. In some cases, there are calls that make memory readable by both the CPU and GPU. This is called managed or unified memory. One example of this is the cudaMallocManaged command. Managed memory allocates the data to host memory or GPU memory, with an image of the data mirrored on the other. However, the application does not direct where the data is stored at any given time, that is managed by a driver. The programming is less complicated, but the cuda driver will move the data back and forth as needed to allow other applications to use the memory. This can increase latency as data is transferred back and forth.

Various embodiments of modern systems include GPU coherent memory. GPU coherent memory is memory which is accessible by the host and GPU without mirroring/transferring the data between the two components. This allows data to be available as it is needed in any location. In some embodiments, coherent memory includes an address translation service (ATS). An ATS may be part of the hardware of the host and provide on the fly translation (without copying the data) of data from a GPU for use on the host. Thus, it is as if the same data is simultaneously present on both the GPU and the host.

Embodiments of the present disclosure increase the efficiency of host/GPU systems. In some embodiments, the efficiency gains are realized by limiting the data transfers between the GPU and the host. In some embodiments, the efficiency gains are realized by eliminating the need to alter application code. In such embodiments, commands in the source code or the like that allocate data to GPU memory (e.g., cudaMalloc) can be changed to commands in the source code or the like to allocate data to coherent memory. However, that may be a time consuming and arduous process. There may be memory allocation commands in a program and hundreds of applications to update. Embodiments of the present disclosure can realize the efficiency gains by not requiring the application code to change.

Embodiments of the present disclosure can realize efficiency gains by changing host operations (e.g., in the software stack, low-level routines, and/or library). In some embodiments, the host intercepts calls that are configured to allocate memory on the GPU. The host may then allocate the memory to the host, and then cause the data to be called into the GPU. These embodiments maintain physical memory on the GPU for faster processing, keeping with the original intent of the user. Also, the returned address can be referenced as a host buffer, which reduces overhead of programming. Finally, intercepting and reallocating the commands can yield better latency and bandwidth performance than calls to directly allocate data in GPU memory.

The aforementioned advantages are example advantages, and embodiments exist that can contain all, some, or none of the aforementioned advantages while remaining within the spirit and scope of the present disclosure.

Figure 1:
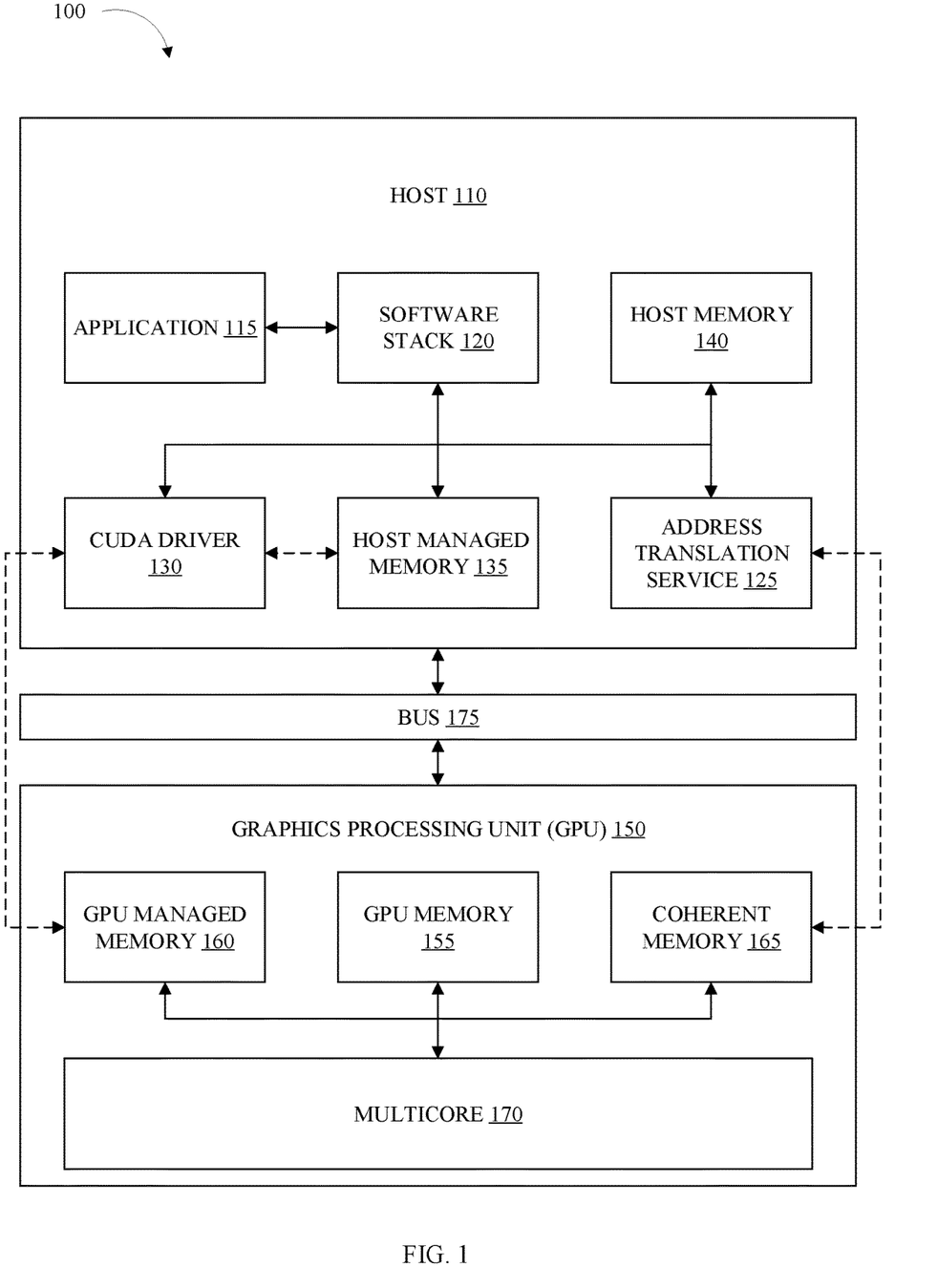
FIG. 1 illustrates a functional diagram of a computing environment suitable for operation of host device, in accordance with some embodiments of the present disclosure.

Referring now to various embodiments of the disclosure in more detail, FIG. 1 is a representation of a computing environment 100 in accordance with one or more embodiments of the present disclosure. Many modifications to the depicted environment may be made by those skilled in the art without departing from the scope of the disclosure as recited by the claims. Computing environment 100 includes host 110, graphics processing unit (GPU) 150, and bus 175.

Host 110 can be a standalone computing device, a management server, a web server, a mobile computing device, or any other electronic device or computing system capable of receiving, sending, and processing data. In other embodiments, host 110 can represent a server computing system utilizing multiple computers as a server system, such as in a cloud computing environment. In some embodiments, host 110 represents a computing system utilizing clustered computers and components (e.g., database server computers, application server computers, etc.) that act as a single pool of seamless resources when accessed within computing environment 100. In some embodiments, host 110 includes application 115, software stack 120, address translation service 125, cuda driver 130, host managed memory 135, and host memory 140.

Application 115 can be any combination of hardware and/or software configured to carry out a function on a computing device (e.g., host 110). In some embodiments, application 115 is a software program (e.g., accounting software, system backup software, word processor, etc.). In some embodiments, application 115 is a web application. In some embodiments, application 115 is a set of instructions configured to perform one or more tasks. In some embodiments, application 115 sends system calls to software stack 120 and receives the processed results from software stack 120. In some embodiments, application 115 includes commands (e.g., cudaMalloc) configured to allocate memory to a GPU.

Software stack 120 can be any combination of hardware and software capable of managing the workload of host 110 and provide access to low-level operating components of the host 110. A software stack can be a set of programs that work together to produce a result (e.g., perform the functions of application 115). Software stack 120 may include an operating system. In some embodiments, software stack 120 includes one or more software libraries. In some embodiments, software stack 120, is a communication channel between application 115 and cuda driver 130. In some embodiments, software stack 120 receives system calls from one or more applications (e.g., application 115) requesting resources of host 110. In these embodiments, software stack 120 prioritizes and executes the system calls based on one or more algorithms. Software stack 120 can be communicatively coupled to the other components of host 110. In some embodiments, the software stack 120 is altered to perform the functions of methods 200 and 300 (illustrated in FIGS. 2 and 3).

Cuda driver 130 can be any combination of hardware and/or software configured to manage data flow between a host and a GPU. In some embodiments, cuda driver 130 provides communication between GPU 150 and host 110. In some embodiments, cuda driver 130 manages the transferring and/or mirroring of data allocated to host managed memory 135 and/or GPU managed memory 135. To accomplish this, it may transfer memory, based on system needs and other paraments, between host managed memory 135 and GPU managed memory 160.

Host memory 140 can be any combination of hardware and/or software configured to store data for processing. In some embodiments, host memory 140 includes one or more caches. Host memory 140 may send data to and receive results from one or more processors (or core) within host 110. In some embodiments, the data stored in host memory 140 changes. The changes are managed by one or more of host 110, application 115, software stack 120, and cuda driver 130.

Host managed memory 135 can be a portion of host memory 140 dedicated to storing data allocated to managed memory. In some embodiments, the size of host manage memory 135 varies based on need. For example, if a first application has several datasets allocated to managed memory, the memory allocated to managed memory will be larger than a second application with few or no managed memory allocations.

Address translation service 125 can be any combination of hardware and/or software configured to translate data addresses. In some embodiments, address translation service 125 is used to maintain coherent memory between host 110 and GPU 150. In some embodiments, address translation service 125 translates virtual addresses from GPU memory 155 into physical addresses that are usable by host 110 on an as needed basis. For example, data is allocated to GPU 150 so the GPU may have prompt access to data for processing. Host 110 may also have access to that data without copying or mirroring the data to host memory 140. In some embodiments, address translation service 125 is integrated into the hardware of host 110. In some embodiments, address translation service 125 is part of a coherent accelerator processor interface (CAPI). CAPI may be part of one or more processing systems.

GPU 150 can be any combination of hardware and/or software configured to simultaneously process large amounts of data. In some embodiments, GPU 150 can perform sequential/serial tasks at a higher rate than host 110. GPU 150 may contain multiple cores that can process several parallel streams simultaneously. This is useful for applications that have a high number of relatively simple calculations (e.g., machine learning). In some embodiments, GPU 150 includes GPU memory 155, GPU managed memory 160, coherent memory 165, and multicore 170.

In some embodiments, GPU 150 can only process data through a GPU kernel. The GPU kernel is invoked prior to or after the data is allocated on GPU 150. In some embodiments, there are additional GPUs within computing environment 100. Each of the additional GPUs may have the same or similar configuration of GPU 150.

GPU memory 155 can be any combination of hardware and/or software configured to store data for processing. GPU memory 155 may send data to and receive results from one or more processors (or cores) within GPU 150 and/or multicore 170. In some embodiments, data is allocated to GPU memory 155 by application 115 and/or software stack 120.

GPU managed memory 160 can be any portion of GPU memory 155 dedicated to storing data allocated to GPU managed memory 160. In some embodiments, GPU managed memory 160 is consistent with host managed memory 135, except it is location in GPU 150.

Coherent memory 165 can be any portion of GPU memory 155 dedicated to storing data allocated to coherent memory. In some embodiments, the size of host manage memory 135 varies based on need. For example, if a first application has several datasets allocated to coherent memory 165, the memory allocated to coherent memory 165 will be larger than a second application with few or no coherent memory 165 allocations. In some embodiments, coherent memory is data allocated in such a way that is physically located in GPU 150, yet host 110 can use the data without mirroring or copying the data into host memory 140. Address translation service 125 may translate data on the fly, essentially allowing host 110 to read the data stored on GPU 150.

Multicore 170 can be a plurality of cores configured to process data in parallel. In some embodiments, each of the cores share one or more data repositories (e.g., GPU memory 155).

Bus 175 can be any combination of hardware and/or software configured to allow data transfer between host 110, GPU 150, and other components within computing environment 100 (e.g., additional GPUs.). In some embodiments, bus 175 includes NVLink™. NVLink is a wire-based communications protocol. It may allow for serial multi lane communication between GPU 150 and host 110.

In some embodiments, bus 175 includes a peripheral component interconnect express (PCIe) interface. PCIe is a high-speed connection and bus. PCIe can have a higher throughput with a lower pin count than some other standard connection types (e.g., peripheral component interconnect (PCI), accelerated graphics port (AGP), etc.). In some embodiments, bus 175 includes a PCI and/or an AGP.

Figure 2:
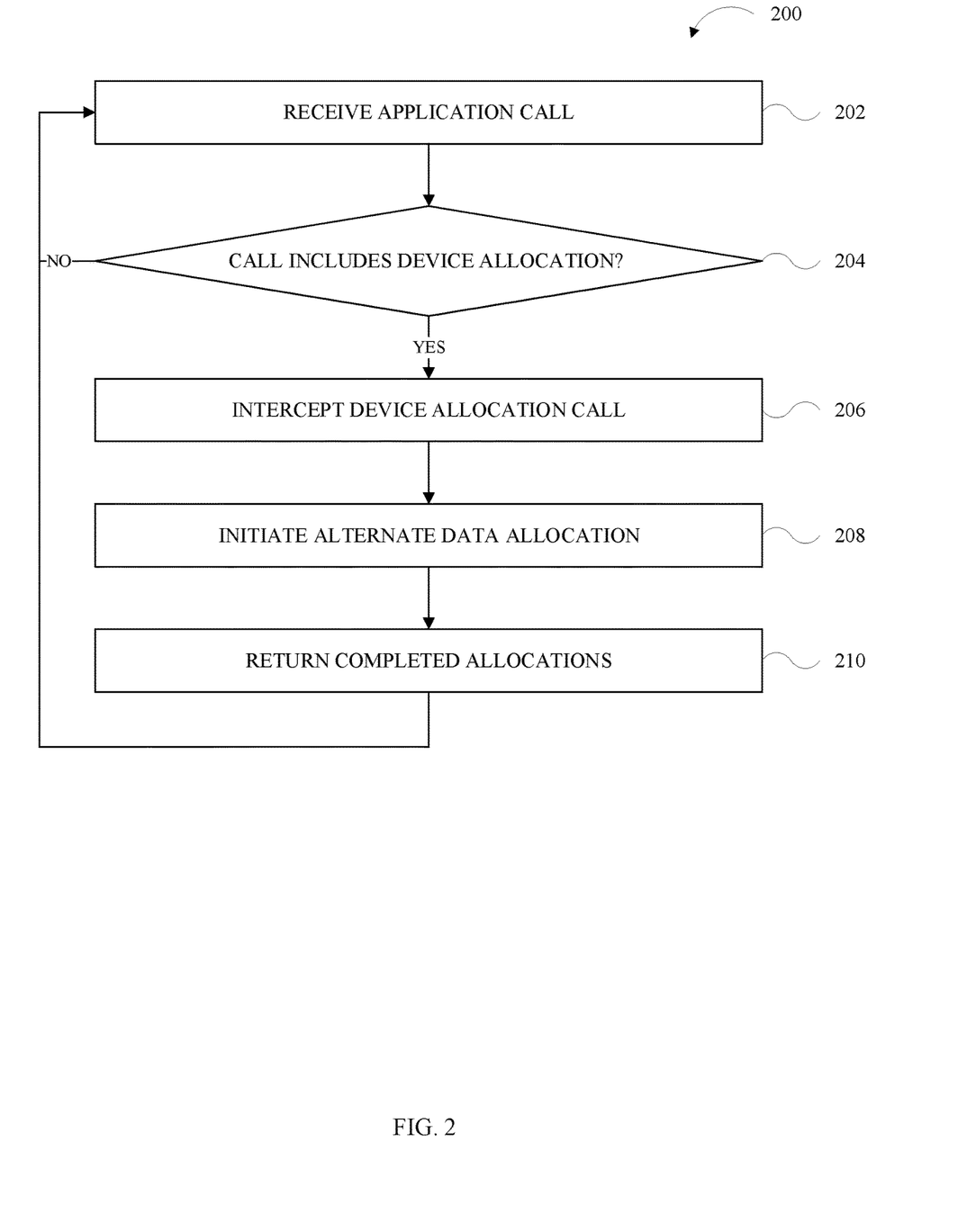
FIG. 2 illustrates a flow chart of an example method for intercepting and altering device allocation calls, in accordance with some embodiments of the present disclosure.
Figure 3:
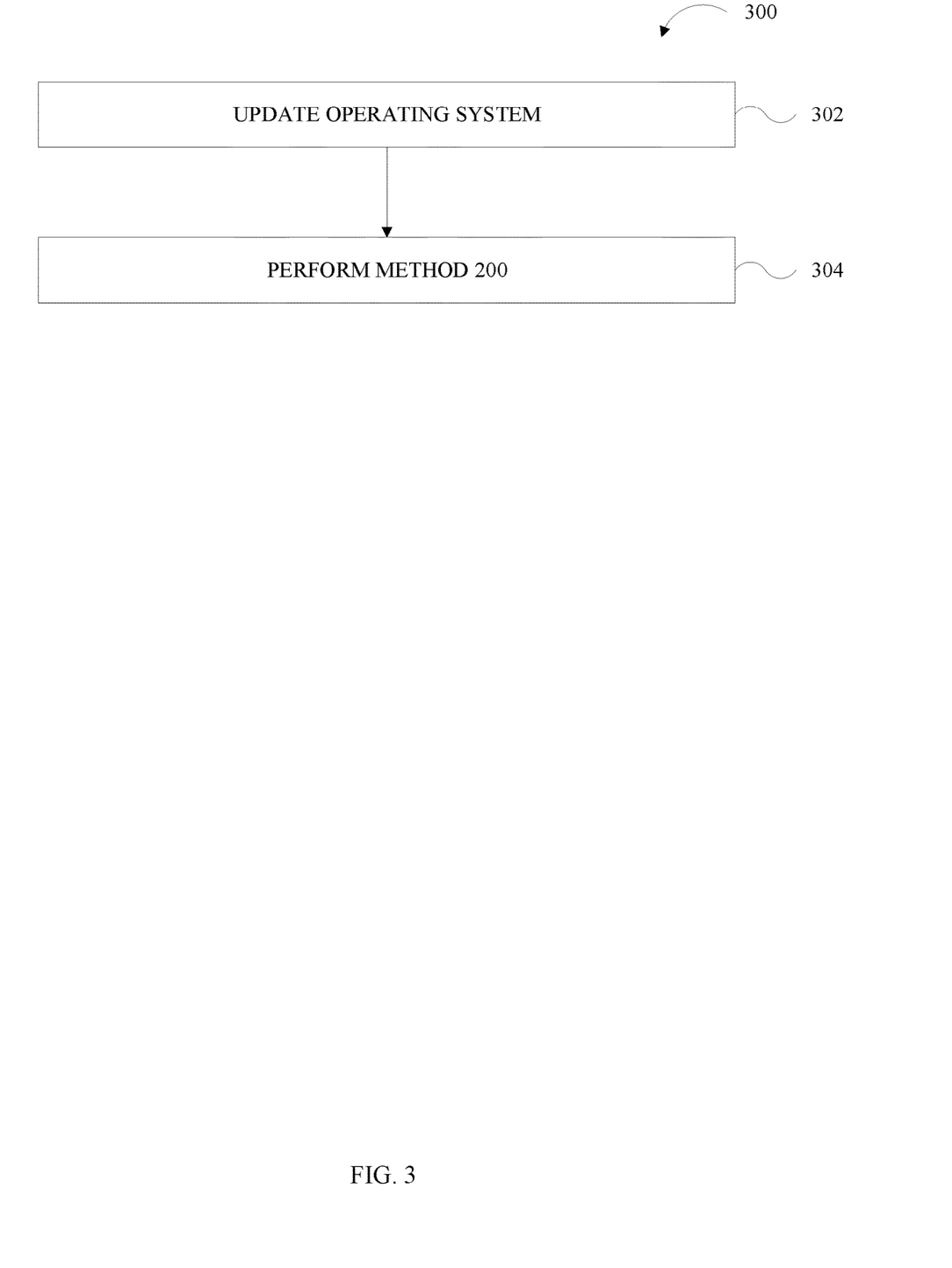
FIG. 3 illustrates a flow chart of an example method updating a software stack to implementing the intercepting and altering device allocation calls, in accordance with some embodiments of the present disclosure.

FIGS. 2 and 3 depict flowcharts of example methods 200, 300, for improving bandwidth performance in data transfers that can be performed in a computing environment (e.g., computing environment 100 and/or host 110). Methods 200 and 300 can include more or fewer operations than those depicted. Methods 200 and 300 can include operations in different orders than the order depicted. Likewise, the methods 200 and 300 can include operations that occur simultaneously rather than sequentially. Many modifications to the depicted method may be made by those skilled in the art without departing from the spirit and scope of the present disclosure. Methods 200 and 300 can be implemented by one or more processors, a computing device (e.g., host 110 of FIG. 1), or a different combination of hardware and/or software. In various embodiments, the various operations of methods 200 and 300 are performed by one or more of host 110, GPU 150, bus 175 and/or any subcomponents of the aforementioned. One or more of the advantages and improvements described above can be realized by the methods 200 and 300, consistent with various embodiments of the present disclosure. To illustrate methods 200 and 300, but not to limit embodiments, FIGS. 2 and 3 are described within the context of the computing environment 100 of FIG. 1. Where elements shown in FIGS. 2 and 3 are identical to elements shown in FIG. 1, the same reference numbers are used in both Figures.

The method 200 depicts a flow chart for intercepting and altering device allocation calls. At operation 202, host 110 receives an application call. In some embodiments, a command is received from application 115. The command may be step or a set of steps in a program configured to instruct a computing device to perform a specific function. Command and call may be used interchangeably in reference to method 200. In some embodiments, the command is received by software stack 120.

At operation 204, host 110 determines if the command includes a device data allocation. In some embodiments, the device is consistent with GPU 150. Any command that is configured allocate any data to one or more GPUs may be a device data allocation command. In some embodiments, the command may be a cudaMalloc, cudaMallocManaged, and/or cuMemAlloc command.

In some embodiments, software stack 120 determines if the command includes a device data allocation. The allocation may be identified by comparing the command against a list of relevant allocation commands. For example, each command that a user wants identified may be added to the list, and each command received is compared against that list. In some embodiments, the allocation is identified when preparing to send the data to one or more GPUs.

If the command is allocating data to GPU 150 (204: YES), then host 110 proceeds to operation 206. If the command is not allocating data to GPU 150 (204: NO), then host 110 returns to operation 202.

At operation 206, host 110 intercepts the device allocation call. In some embodiments, the intercepted call is not completed. In some embodiments, the call is intercepted as a result of host 110 (or software stack 120) not passing the call to cuda driver 130.

At operation 208, host 110 initiates an alternate data allocation. In some embodiments, the alternate data allocation includes one or more system calls. Here, the system calls may allocate data to a GPU, but do so in a location/form that is different than the original call. For example, when an application allocates data to GPU 150, it is because the GPU 150 can more efficiently perform a function. Simply intercepting the command does not provide benefit. However, intercepting a cudaMalloc command and replacing it with commands that allocate the data to coherent memory 165 may provide a benefit. The data is still physically present on the GPU 150, so it can be quickly processed. Also, the data is available to host 110 as needed, without having to transfer/mirror data between the two components.

In some embodiments, operation 208 includes two or more separate calls. In some embodiments, the two or more calls include a host allocation and a call allocating the data on GPU physical pages (e.g., GPU memory 155). The host allocation command may be a glibc malloc command and/or a mmap command. The GPU allocations may be cudaMemPrefetchAsync command and/or a mbind command. In some embodiments, the glibc malloc and the cudaMemPrefetchAsync are paired together. In some embodiments, the mmap and mbind commands are paired together.

At operation 210, host 110 returns the completed allocation. In some embodiments, the allocations are returned to application 115.

In some embodiments method 200 can increase the efficiency of host/GPU interactions. It does this by intercepting calls that allocate data that can only be read by a GPU, and reallocates the data in a form where it can be accessed by both the GPU and the host (e.g., GPU 150 and host 110). This leads to better latency and bandwidth performance. It also reduces computing overhead by limiting the amount of data transferred/mirrored between the host and GPU. All of this is done without negatively effecting the speed of GPU processing.

FIG. 3 depicts a flowchart of an example method 300. The method 300 depicts an example method for updating a software stack and implementing the intercepting and altering device allocation calls illustrated in FIG. 2.

At operation 302, host 110 updates software stack 120. In some embodiments, host 110 updates one or more of the drivers and/or software libraries are updated. In some embodiments, the update includes functionality for monitoring for device allocation calls. In some embodiments, the update includes functionality for intercepting device allocation calls. In some embodiments, the update includes functionality for initiating alternate allocation calls. For example, when a computing system includes all the necessary hardware, software stack 120 may be updated to provide the new functionality. The update may be adding one or more drivers to existing functions. It may be possible to obtain similar results by updating all the device allocation calls in application 115. However, such an update would need to be completed for each application, and for each call in each application. It can be less time intensive to update software stack 120 without updating each application. At operation 304, host 110 performs method 200.

Figure 4:
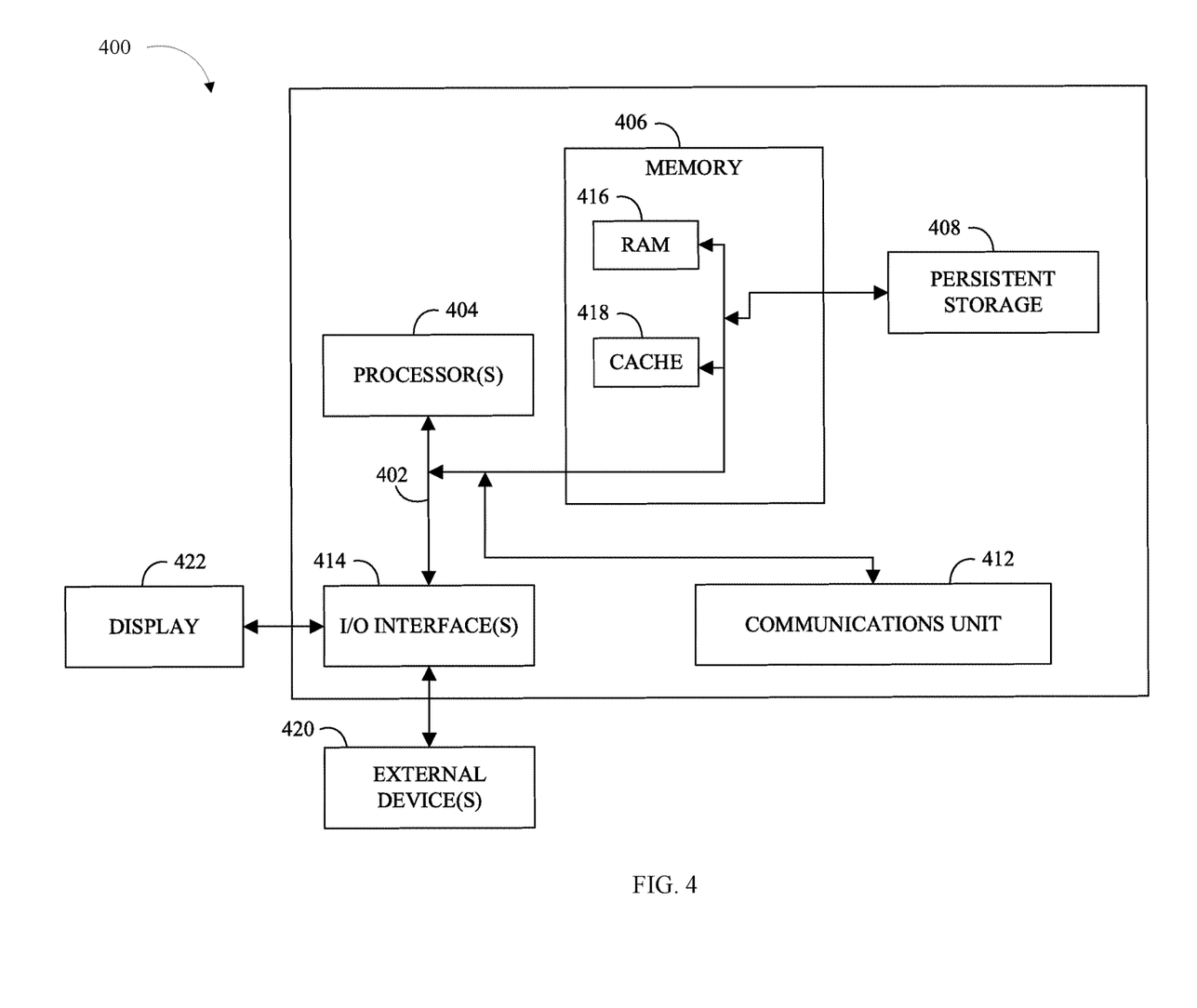
FIG. 4 illustrates a block diagram of an example computer system capable of operating a host device, in accordance with some embodiments of the present disclosure.

FIG. 4 is a block diagram depicting components of a computer 400 suitable for intercepting and replacing device allocation calls in accordance with at least one embodiment of the invention. In an embodiment, computer 400 is representative of host 110. Computer 400 includes one or more processor(s) 404 (including one or more computer processors), a communications fabric 402, a memory 406 that includes a RAM 416 and a cache 418, a persistent storage 408, a communications unit 412, I/O interface(s) 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any of one or more suitable volatile or non-volatile computer readable storage media.

Program instructions may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EE-PROM), flash memory, or any other computer readable storage medium that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external device(s) 420, which may be a keyboard, keypad, a touch screen, or other suitable input devices. External devices 420 may also include portable computer readable storage media, such as thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for rerouting device allocation commands to a GPU having GPU memory through a driver and a software stack, wherein the rerouting further comprises:
   updating the software stack, wherein the updated software stack allows for adding drivers to monitor for relevant device allocation commands to be redirected to an address translation service;
   subsequent to the updating, performing the steps of:
      receiving, a call from an application on a host having a host memory;
      determining that the call includes a relevant device allocation command, wherein the device allocation command is configured to allocate a set of data to the graphical processing unit (GPU);
      dynamically intercepting the call to prevent the call from being passed to the driver on the host;
      initiating an alternate data allocation command, wherein the alternate data allocation command allocates data to a coherent memory, and the coherent memory uses a portion of the GPU memory and is physically located on the GPU, and further the data stored in the coherent memory is accessible to the host through the address translation service located on the host without mirroring the data to the host memory, wherein the address translation service allows the host to access the data in the coherent memory by translating a virtual GPU address into a physical address usable by the host;

completing the alternate data allocation command; and returning the completed alternate data allocation command to the application.

2. The method of claim 1, wherein the application has a first state at a first time prior to the updating, and a second state at a second time after the updating; and wherein the first state and the second state are the same.

3. The method of claim 1 where the alternate data allocation command includes a first command and a second command.

4. The method of claim 3, wherein the first command allocates data on the host, and the second command allocates data on the GPU.

5. The method of claim 4, wherein the first command includes an mmap command, and the second command includes a mbind command.

6. The method of claim 4, wherein the first command includes a glibc malloc command, and the second command includes a cudaMemPrefetchAsync command.

7. The method of claim 1, wherein the call is a cudaMalloc call.

8. The method of claim 1, wherein the call is a cudaMallocManaged call.

9. The method of claim 1, wherein the host transfers data to the GPU via a NVLink.

10. A system for rerouting device allocation commands to a GPU having GPU memory through a driver and a software stack, wherein the system comprises:

a processor; and a computer-readable storage medium communicatively coupled to the processor and storing program instructions which, when executed by the processor, are configured to cause the processor to:

update the software stack, wherein the undated software stack allows for adding drivers to monitor for relevant device allocation commands to be redirected to an address translation service;

subsequent to the updating, performing the steps of:

receive, a call from an application on a host having a host memory;

determine that the call includes a relevant device allocation command, wherein the device allocation command is configured to allocate a set of data to the graphical processing unit (GPU);

dynamically intercept the call to prevent the call from being passed to the driver on the host;

initiate an alternate data allocation command, wherein the alternate data allocation command allocates data to a coherent memory and the coherent memory uses a portion of the GPU memory and is physically located on the GPU, and further the data stored in the coherent memory is accessible to the host though the address translation service located on the host without mirroring the data to the host memory, wherein the address translation service allows the host to access the data in the coherent memory by translating a virtual GPU address into a physical address usable by the host;

complete the alternate data allocation command; and return the completed alternate data allocation command to the application.

11. The system of claim 10, wherein the alternate data allocation command includes a first command and a second command.

12. The system of claim 11, wherein the first command allocates data on the host, and the second command allocates data on the GPU.

13. A computer program product for rerouting device allocation commands to a GPU having GPU memory though a driver and a software stack, the computer program product comprising a computer readable storage medium having program instructions embodied therewith, the program instructions executable by a processing unit to cause the processing unit to:

update the software stack, wherein the updated software stack allows for adding drivers to monitor for relevant device allocation commands to be redirected to an address translation service;

subsequent to the updating, performing the steps of:

receive, a call from an application on a host having a host memory;

determine that the call includes a relevant device allocation command, wherein the device allocation command is configured to allocate a set of data to the graphical processing unit (GPU), wherein the host transfers data to the GPU via a NVLink;

dynamically intercept the call to prevent the call from being passed to the driver on the host;

initiate an alternate data allocation command, wherein the alternate data allocation command allocates data to a coherent memory, and the coherent memory uses a portion of the GPU memory and is physically located on the GPU, and further the data stored in the coherent memory is accessible to the host through the address translation service located on the host without mirroring the data to the host memory, wherein the address translation service allows the host to access the data in the coherent memory by translating a virtual GPU address into a physical address usable by the host;

complete the alternate data allocation command; and return the completed alternate data allocation command to the application.

14. The computer program product of claim 13, wherein the alternate data allocation command includes a first command and a second command, the first command allocates data on the host, and the second command allocates data on the GPU.

* * * * *